United States Patent [19]

Hara et al.

[11] Patent Number: 4,505,562
[45] Date of Patent: Mar. 19, 1985

[54] FILM SUPPORTING APPARATUS FOR CAMERAS

[75] Inventors: Hiroshi Hara, Tokyo; Takashi Tobioka, Saitamaken; Tetuo Nishizawa, Saitama; Takeshi Yoshino, Saitama, all of Japan

[73] Assignee: Fuji Photo Film Co., Ltd., Kanagawa, Japan

[21] Appl. No.: 536,398

[22] Filed: Sep. 27, 1983

[30] Foreign Application Priority Data

Sep. 30, 1982 [JP] Japan .................. 57-147144[U]

[51] Int. Cl.³ .................. G03B 1/48; G03B 17/28
[52] U.S. Cl. .................. 354/203; 354/212
[58] Field of Search .................. 354/203, 212, 288; 352/223, 224, 227

[56] References Cited

U.S. PATENT DOCUMENTS

| | | | |
|---|---|---|---|
| 3,002,438 | 10/1961 | Trow | 354/203 |
| 3,103,861 | 9/1963 | Koeppe | 354/203 |
| 3,550,512 | 12/1970 | Lange | 354/203 |
| 3,563,144 | 2/1971 | Fukino | 352/227 |
| 3,707,904 | 1/1973 | Engelsman et al. | 352/221 |
| 4,332,453 | 6/1982 | Seely et al. | 354/288 |

Primary Examiner—A. A. Mathews
Attorney, Agent, or Firm—Young & Thompson

[57] ABSTRACT

In a camera of the type having a film supply chamber opening at the bottom of the camera into which a container including a coiled strip film with its leader previously drawn out is inserted for film loading, a film supporting apparatus for holding the loaded film flat in film plane comprises a pressure plate and a holding frame for resiliently holding the pressure plate in cantilever fashion. The pressure plate can be displaced in the direction parallel to optical axis of the camera for assured advancement of the film to a film take-up chamber.

5 Claims, 6 Drawing Figures

FILM SUPPORTING APPARATUS FOR CAMERAS

BACKGROUND OF THE INVENTION

The present invention relates to a film supporting apparatus for cameras for supporting film flat and, more particularly, relates to a film supporting apparatus to be built in cameras of a bottom-loaded type in which a film supply chamber is opened at the bottom thereof for film loading.

There have been proposed several kinds of bottom-loaded cameras which are provided with a film supply chamber having an entrance opening opened at the bottom of the camera and a straight guide slot connecting the film supply chamber and a film take-up chamber. In such cameras, a film container including a filmstrip is inserted endwise into the film supply chamber through the entrance opening. At the same time, the film leader, which is previously drawn out of the container and is normally curled, is inserted longitudinal edge first into the straight guide slot of a film passageway so as to be placed in position for film loading. Before any film is loaded in the camera, a film pressure plate mounted on the inside of a back cover is removed from the film passageway by partially opening the back cover for exposing the entrance opening and the guide slot in order to provide sufficient space for threading the film leader in the film passageway and is moved into the film passageway for holding the film flat in the film plane.

One of the problems associated with bottom-loaded cameras utilizing such film loading mechanism as mentioned above is that the forward end of the film leader to be threaded into the film passageway is often caught inside the exposure aperture frame of the camera due to the curled film leader unless sufficient film leader is previously drawn out of the film container. This difficulty can result in a failure to place the film leader in position and, if the film leader is forced into the film passageway, in a bending of the marginal portion of the film which may prevent it from then being wound up. This is an important problem in auto-loading camera adapted to automatically wind up a film after insertion of a film container into the film supply chamber and a previously drawnout film leader into the film passageway. The reason is that, in bottom-loaded cameras of the type having an auto-loading mechanism, a back cover is usually restricted in its movement by the limited space in which it can be partially opened during film loading in order to permit limited access to the camera interior for the purpose of protection of the camera interior. The back cover, however, is adapted to be fully opened so as to permit access to the camera interior for removing or releasing the film leader caught inside the exposure aperture frame upon removing the pressure plate from the passageway.

SUMMARY OF THE INVENTION

It is therefore an object of the present invention to provide a film supporting apparatus for a camera, which permits a film leader extending from a film container, if it is caught inside an exposure aperture frame of the camera, to be released by forcing the film container fully into a film supply chamber.

It is another object of the present invention to provide a film supporting apparatus for a camera which can allow a film leader to be easily and certainly inserted into a guide slot of a passageway of the camera upon inserting a film container.

It is a further object of the present invention to provide a film support apparatus for a camera which can hold a loaded film flat in an appropriate position behind an exposure aperture of the camera.

It is a still further object of the present invention to provide a film support apparatus for a camera which can be built in the camera without making it bulky as a whole because of its simple construction.

The abovementioned objects of the present invention are achieved by providing a film pressure plate for a camera resiliently mounted in cantilever fashion which is displaceable on a side opposite to a film take-up chamber of the camera in the direction substantially parallel to the optical axis of an objective or taking lens of the camera and normal to the direction of advancement of a loaded film in the camera. The film pressure plate permits a film leader, if it is unexpectedly caught inside an exposure aperture frame defining the exposure aperture of the camera upon insertion of film into the camera, to be released from the exposure aperture frame upon continued insertion of the film into the film supply chamber. Furthermore, the pressure plate is located spaced apart from a plane which, in turn, is defined by the rear side of a straight guide slot for film insertion so as to insure smooth insertion into a film passageway of the camera through the straight guide slot. The film pressure plate is coupled to a holding frame by way of a resilient substantially rectangular frame member, providing a film supporting apparatus as a unit which, in turn, is able to be integrally mounted on a camera.

BRIEF DESCRIPTION OF THE DRAWINGS

The foregoing and other objects, features and advantages of the present invention will become apparent from the following detailed description of the preferred embodiment of a present invention as illustrated in the accompanying drawings wherein.

Before the description of the present invention proceeds, it is to be noted that like parts are designated by like numerals and symbols throughout the several views of the accompanying drawings.

DETAILED DESCRIPTION OF THE INVENTION

Figure 1:
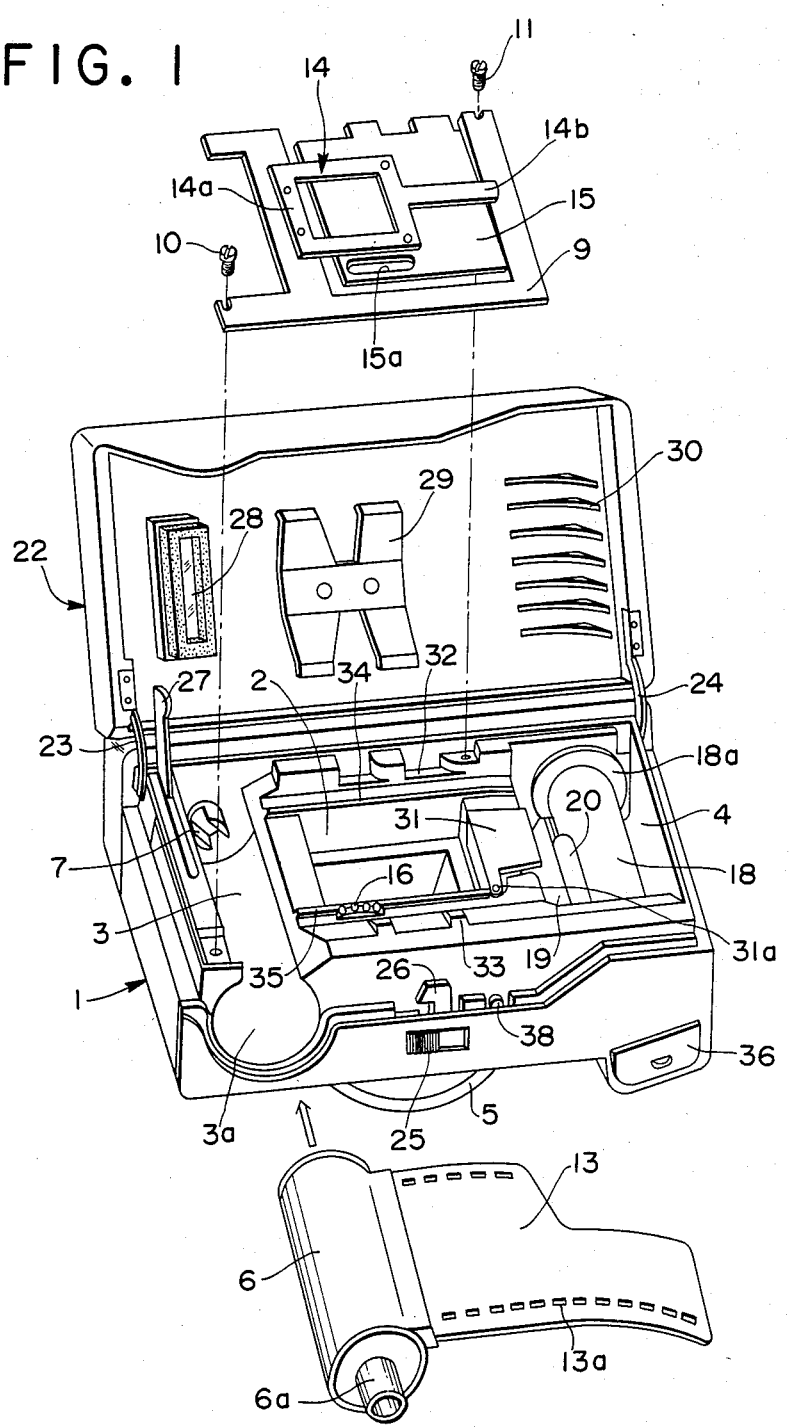
FIG. 1 is an exploded perspective view of a film supporting apparatus embodying the present invention which is removed from a camera with its back cover fully opened.

In FIG. 1 showing a film supporting apparatus in accordance with the present invention embodied in a bottom-loaded still camera of which the back cover is fully opened for clearly showing the interior mechanism, a camera main body 1 is provided with an exposure aperture 2 in the middle thereof and a film supply and a film take-up chamber 3, 4 on opposite sides of the exposure aperture, respectively. Mounted on the camera body 1 in alignment with the exposure aperture 2 is an objective or taking lens 5. A film container 6 containing a coiled filmstrip is inserted endwise, i.e., axially into the film supply chamber 3 through an entrance 3a opened at the bottom of the camera body 1. Rotatably mounted in the film supply chamber 3 is a film rewinding shaft having a fork 7 which is operatively engageable with a cross-rib provided at one end of a spool shaft 6a of the film container upon inserting the latter into the film supply chamber 3.

A pressure plate holding frame 9, which is adapted to hold a film pressure plate 15 well-known per se in cantilever fashion by way of a connecting member 14 which may take the form of a resilient frame, is located behind and over the film supply chamber 3 and the exposure aperture 2, and is secured to the camera body 1 by means of, for instance set screws 10 and 11. The connecting member 14 which is resilient as a whole comprises a rectangular frame section 14a with one side fixedly mounted on the pressure plate holding frame 9 and the opposite side thereof on the pressure plate 15, and an arm section 14b which extends from the opposite side of the pressure plate holding frame 9 and is resiliently abuttable against the rear surface of the pressure plate holding frame 9. The connecting member 14 is deformed in such a way that the lower edge (upper side in FIG. 1) of the pressure plate 15 is slightly raised over a plane defined by the rear surface of the pressure plate holding frame 9 so as to prevent unexpected insertion of a film leader into the space between the pressure plate holding frame 9 and the lower edge of the pressure plate 15. The pressure plate 15 contains an elongated slot 15A which permits a film advancing means which may take the form of an endless belt 16 with an annular series of teeth or projections engageable with perforations in a marginal portion of the filmstrip, provided on the peripheral surface of belt 16 at regular intervals, to move without interference.

Figure 2:
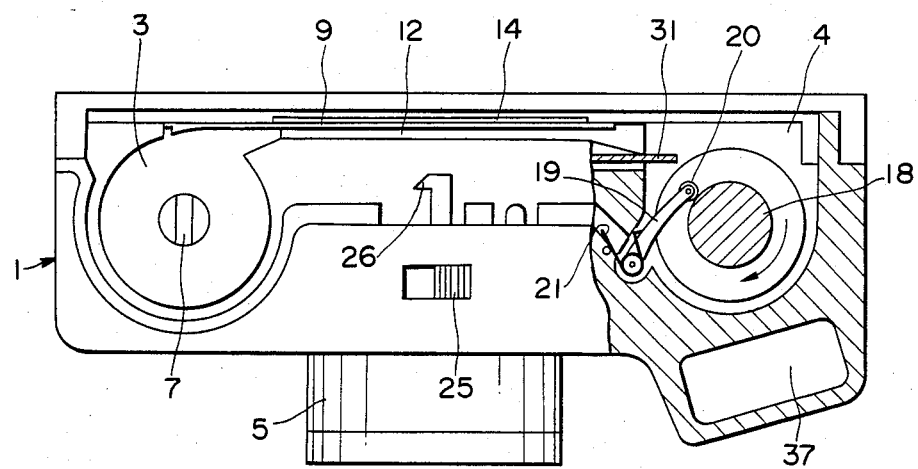
FIG. 2 is a bottom plan view, partly in cross section, of the camera of FIG. 1.

Within the film take-up chamber 4, there is provided a take-up spool 18 with a flange 18A well-known per se and a guide member 19 pivotably mounted as shown in detail in FIG. 2, the latter having the form of a curved plate so as to conduct the forward end of the film leader toward the inside of the film take-up chamber 4 and having a roller 20 rotatably mounted at its free end which operates to press the conducted film leader onto the peripheral surface of the take-up spool 18. The guide member 19 is, as is well-known in the art, urged by a spring 21 as seen in FIG. 2 so as to pivotably move clockwise. When the film leader reaches the roller 20, the roller 20 presses it against the adjoining portion of the take-up spool 18 and insures that the friction between the film leader and the peripheral surface of the take-up spool suffices to cause the film to form a succession of tightly wound convolutions. As the diameter of the take-up spool 18 gradually increases, the spring-urged guide member 19 is forced to rotate about a shaft, so that the convolutions wound around the take-up spool 18 receive no excessive force from the roller 20. Hence the take-up spool 18 can continue to rotate smoothly, and it follows that the convolutions are not loosened.

A back cover 22, as shown in FIG. 1, is supported for pivotal opening and closing movement on the camera body 1 at the top by a pair of arms 23 and 24. A manually slidable locking element 25 is located on the bottom of the camera body 1 and urged by a spring (not shown) so as to cause a latch 26 to engage a finger (not shown) mounted on the back cover 22. The slidable movement of the locking element 25 to the right permits the back cover 22 to be forced open by a spring-urged lever 27. It is to be noted that the back cover 22 can be fully opened to a position where the rear side of the camera body 1 is exposed as shown in FIG. 1 by the manipulation of another locking member (not shown) for the sake of repairing an interior mechanism, while the back cover 22 is partially opened on ordinary occasions for allowing limited access to the camera interior for film loading. The back cover 22 is further provided with a viewing window 28 through which indications on the film container such as film speed and exposure number can be viewed, a spring member 29 for pressing against the rear side of the pressure plate 15 and a plurality of protrusions 30 for guiding the forward end of the film 13.

Provided between the exposure aperture 2 and the film take-up chamber 4 is a guide plate 31 pivotably mounted on a shaft 31A parallel to the optical axis which is pivoted clockwise by and then permits advancement of the film 13 to the film take-up chamber 4 in the case of the forward end being caught in the exposure aperture 2 upon film loading. Positioning surfaces 32 and 33 are provided at the upper and lower sides of the exposure aperture 2 to locate the pressure plate 15 in the position which defines a film passageway in cooperation with guide rails 34 and 35. A member denoted by numeral 36 is a cover for battery chamber 37.

Turning now to FIG. 2, it can be seen that the camera body 1 with the back cover omitted for the sake of clarity is adapted to be partially opened at the bottom portion to expose the entrance opening 3a for the container 6 and a straight guide slot 12 defined between the camera body 1 and pressure plate holding plate 9 for entrance of the film leader so as to permit film loading. As the film container 6 is inserted endwise into the entrance opening 3a to the film supply chamber 3, the leader portion of the film 13 moves longitudinal edge first into the straight guide slot 12 to a passageway which is, in turn, defined between the pressure plate 15 and the guide rails 34 and 35.

Figure 3:
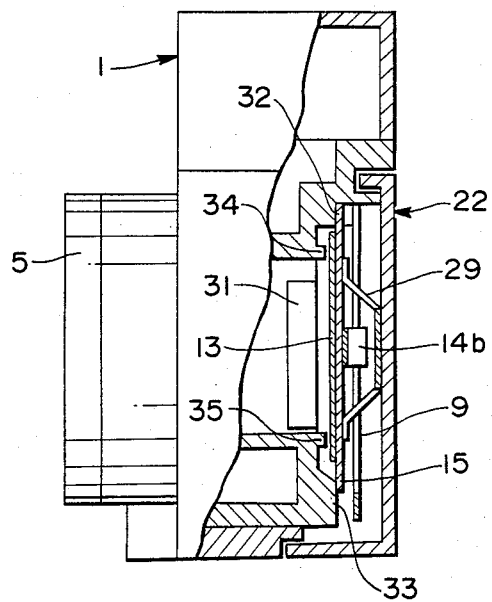
FIG. 3 is a side view, partly in vertical section, of the camera of FIG. 1.

As shown in FIG. 3, upon closing the back cover 22, the pressure plate 15 is forced from its back side by a leaf spring 29 to abut against the positioning surfaces 32 and 33, so as to hold the film flat in the film plane, that is, the focal plane of the taking lens 5 between the guide rails 34 and 35 and the pressure plate 15. Complete closing of the back cover 22 causes it to be automatically locked in the closed position and simultaneously causes movement of a detecting lever 38 to turn ON a switch (not shown) which, in turn, activates a well-known film advancing mechanism including a drive motor accommodated in the take-up spool 18. Rotation of the drive motor causes the endless belt 16 for advancing film and the take-up spool 18 itself to rotate. As is described hereinbefore, the rotating endless belt 16 with its teeth in the perforations 13a of the film 13 advances the film 13 to cause the forward end of the film leader to reach the film take-up chamber 4. When the film leader reaches the film take-up chamber 4, the forward end of the film leader is pressed by the roller 20 against the adjoining portion of the take-up spool 18 and is thereby wound therearound so as to form a succession of convoltions. In this manner, the film 13 is wound automatically by and onto the take-up spool 18.

Continuous winding of the film 13 by several unavailable leading frames forces the motor to stop. After this, the film 13 is wound automatically by one frame every manipulation of a shutter actuating member (not shown). In this preferred embodiment, complete exposure of all available frames of the film 13 causes the motor, and hence the endless belt 6 and the film take-up spool 18, to rotate in the reverse direction so as to rewind the film 13 automatically into the container 6 in a well-known manner.

Figure 4:
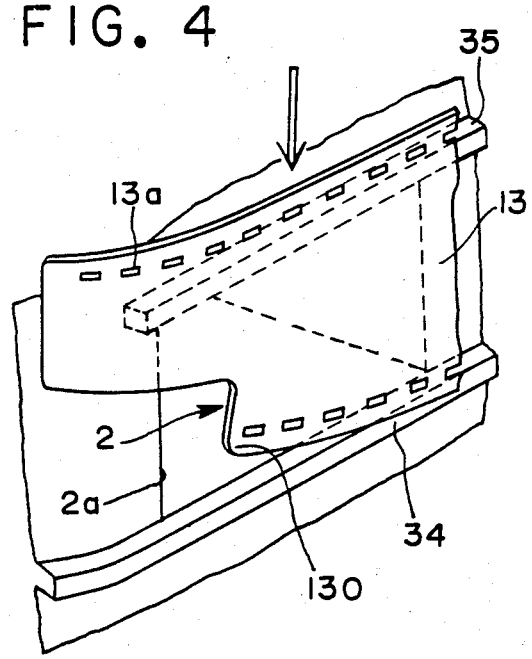
FIG. 4 is a schematic illustration showing a general state wherein a film leader is caught inside an exposure aperture frame.

As shown in FIG. 4, when the film leader is inserted into the straight guide slot 12 of the film passageway of the camera, which is shown positioned upside down in FIG. 4, the inserted leader portion 130 enters the exposure aperture 2 and is often caught therein, especially, inside the upper wall 2a adjacent to the film take-up chamber 4 due to the curled leader.

Figure 5A:
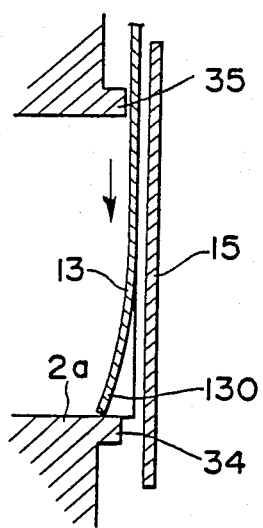
FIGS. 5(A) and (B) are schematic illustrations showing general actions of the film pressure plate in accordance with the present invention.
Figure 5B:
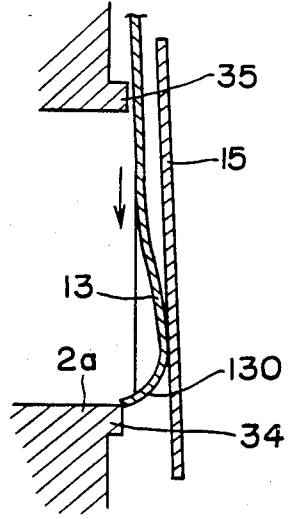

FIGS. 5(A) and (B) show how the pressure plate held in cantilever fashion acts against the film inserted into the camera. As the film leader is inserted into the passageway with insertion of the film container into the film supply chamber 3 from the bottom of the camera, it may happen that the forward portion 130 of the film leader will be caught inside the exposure aperture as shown in FIG. 5(A). However, in this case, forcing the film leader into the passageway causes the forward portion 130 to bend and to gradually enlarge the bent portion while forcing the lower side (in FIG. 5) of the pressure plate rearward, so as to gradually increase the space provided between the upper guide rail 34 (which is shown at the bottom in FIG. 5) and the pressure plate 15 and thereby to permit the forward portion 130 of the film leader to ride across the exposure aperture 2 and hence the guide rail 34. As a result of this, the film leader can be appropriately positioned in the passageway of the camera.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A film supporting apparatus for a camera for use with a film container including a coiled filmstrip having a leader previously drawn out thereof which camera is of the type having, on opposite sides of an exposure aperture, a film take-up chamber and a film supply chamber into which the container is inserted endwise; said film supporting apparatus comprising:
   a pressure plate for holding a film flat in a film plane of the camera; and
   a holding frame fixedly mounted on said camera, and means carried by said holding frame for resiliently holding said pressure plate in cantilever fashion so as to permit said pressure plate at the side adjacent the film take-up chamber to displace rearwardly in the direction parallel to the optical axis of said camera.

2. A film supporting apparatus as defined in claim 1 wherein said camera has a body and said pressure plate holding frame is fixedly mounted on said camera body and defines a straight guide slot between said pressure plate and said body so as to provide an entrance for insertion of said film leader.

3. A film supporting apparatus as defined in claim 1 wherein said pressure plate is coupled in cantilever fashion to said pressure plate holding frame adjacent said film supply chamber by means of a resilient member.

4. A film supporting apparatus as defined in claim 1 wherein said resilient member is previously so deformed that said pressure plate is inclined downwardly rearwardly when said optical axis is horizontal.

5. A film supporting apparatus as defined in claim 1 wherein said resilient member comprises a substantially rectangular frame fixedly mounted on said pressure plate holding frame adjacent said film supply chamber and an arm extending from said rectangular frame and abutting against the side of said pressure plate holding frame adjacent to said film take-up chamber.

* * * * *